United States Patent
Awad et al.

(10) Patent No.: US 12,207,272 B2
(45) Date of Patent: Jan. 21, 2025

(54) METHODS, COMMUNICATIONS DEVICES, AND INFRASTRUCTURE EQUIPMENT FOR ACTIVATING AND/OR DEACTIVATING CONFIGURED GRANTS

(71) Applicant: Sony Group Corporation, Tokyo (JP)

(72) Inventors: Yassin Aden Awad, Basingstoke (GB); Vivek Sharma, Basingstoke (GB); Yuxin Wei, Basingstoke (GB); Hideji Wakabayashi, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 433 days.

(21) Appl. No.: 17/614,556

(22) PCT Filed: May 29, 2020

(86) PCT No.: PCT/EP2020/065076
§ 371 (c)(1),
(2) Date: Nov. 29, 2021

(87) PCT Pub. No.: WO2020/259960
PCT Pub. Date: Dec. 30, 2020

(65) Prior Publication Data
US 2022/0232618 A1    Jul. 21, 2022

(30) Foreign Application Priority Data
Jun. 25, 2019  (EP) .................................... 19182371

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0053* (2013.01); *H04L 5/0098* (2013.01); *H04W 28/26* (2013.01); *H04W 72/044* (2013.01)

(58) Field of Classification Search
CPC ... H04W 28/26; H04W 72/044; H04W 72/23; H04L 5/0053; H04L 5/0098
See application file for complete search history.

(56) References Cited

U.S. PATENT DOCUMENTS

2012/0282942 A1*  11/2012  Uusitalo ............... H04W 16/14
                                                    455/452.2
2018/0160418 A1*   6/2018  Luo .................... H04W 72/1263
(Continued)

OTHER PUBLICATIONS

International Search Report and Written Opinion mailed on Aug. 7, 2020, received for PCT Application PCT/EP2020/065076, Filed on May 29, 2020, 13 pages.
Holma et al., "LTE for UMTS OFDMA and SC—FDMA based radio access", John Wiley and Sons, 2009, 232 pages.
(Continued)

*Primary Examiner* — Jeong S Park
(74) *Attorney, Agent, or Firm* — XSENSUS LLP

(57) ABSTRACT

A method for transmitting data by a communications device to an infrastructure equipment in a cell of a wireless communications network is provided. The method comprises receiving an indication of a plurality of configured grants, each of the configured grants allocating a set of communications resources for the transmission of the data by the communications device within one of a plurality of bandwidth parts defining a frequency range within a system bandwidth of the cell, determining that one or more of the plurality of configured grants should be activated and/or determining that one or more of the plurality of configured grants should be deactivated, and transmitting, to the infrastructure equipment, one or both of an activation signal if the communications device determines that one or more configured grants should be activated and a deactivation signal (Continued)

if the communications device determines that one or more configured grants should be deactivated.

19 Claims, 6 Drawing Sheets

(51) Int. Cl.
*H04W 28/26* (2009.01)
*H04W 72/044* (2023.01)

(56) References Cited

U.S. PATENT DOCUMENTS

| | | | |
|---|---|---|---|
| 2018/0359735 A1* | 12/2018 | Lee | H04W 72/23 |
| 2019/0090222 A1* | 3/2019 | Wu | H04W 72/20 |
| 2019/0097762 A1* | 3/2019 | Jeon | H04L 1/1864 |
| 2019/0149279 A1 | 5/2019 | Lee et al. | |
| 2019/0190681 A1* | 6/2019 | Li | H04W 76/34 |
| 2019/0349983 A1* | 11/2019 | Loehr | H04L 1/1819 |
| 2021/0045184 A1* | 2/2021 | Sato | H04W 76/38 |
| 2021/0266953 A1* | 8/2021 | Pelletier | H04W 72/23 |
| 2021/0337585 A1* | 10/2021 | Liu | H04L 5/0098 |

OTHER PUBLICATIONS

RAN1, "LS on multiple active configured grant configurations", 3GPP TSG RAN WG2#104, R2-1818991, Nov. 12-16, 2018, 1 page.

Nokia et al., "Revised SID: Study on NR Industrial Internet of Things (IoT)", 3GPP TSG RAN meeting #81, RP-182090, Sep. 10-13, 2018, 5 pages.

3GPP, "Medium Access Control (MAC) protocol specification (Release 15)", 3GPP TS 38.321 V15.3.0, Sep. 2018, 76 pages.

Huawei et al., "New SID on Physical Layer Enhancements for NR Ultra-Reliable and Low Latency Communication (URLLC)", 3GPP TSG-RAN#81, RP-182089, Sep. 10-13, 2018, 5 pages.

Nokia et al., "LCP restrictions with multiple CG configurations", 3GPP TSG-RAN WG2 Meeting #106, R2-1907196, May 13-17, 2019, 2 pages.

Lenovo et al., "Discussion of procedures for UL transmission with and without grant", 3GPP TSG RAN WG1 Meeting #89, R1-1707766, May 15-19, 2017, 4 pages.

CMCC, "Outstanding Issues for multiple SPSs-CGs Support", 3GPP TSG-RAN WG2 #105bis, R2-1904355, Apr. 8-12, 2019, 7 pages.

3GPP, "Study on NR Industrial Internet of Things (IoT); Release 16", 3GPP TR 38.825 V0.2.0, Mar. 2019, 32 pages.

* cited by examiner

METHODS, COMMUNICATIONS DEVICES, AND INFRASTRUCTURE EQUIPMENT FOR ACTIVATING AND/OR DEACTIVATING CONFIGURED GRANTS

CROSS-REFERENCE TO RELATED APPLICATIONS

The present application is based on PCT filing PCT/EP2020/065076, filed May 29, 2020, which claims priority to EP 19182371.5, filed Jun. 25, 2019, the entire contents of each are incorporated herein by reference.

BACKGROUND

Field of Disclosure

The present disclosure relates to communications devices, infrastructure equipment and methods for the transmission of data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

One example of a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method for transmitting data by a communications device to an infrastructure equipment in a cell of a wireless communications network. The method comprises receiving an indication of a plurality of configured grants, each of the configured grants allocating a set of communications resources for the transmission of the data by the communications device within one of a plurality of bandwidth parts defining a frequency range within a system bandwidth of the cell, determining that one or more of the plurality of configured grants should be activated and/or determining that one or more of the plurality of configured grants should be deactivated, and transmitting, to the infrastructure equipment, one or both of an activation signal if the communications device determines that one or more configured grants should be activated and a deactivation signal if the communications device determines that one or more configured grants should be deactivated. The activation signal indicates that the set of communications resources of each of the one or more configured grants that should be activated should be reserved for use by the communications device, and the deactivation signal indicates that the set of communications resources of each of the one or more configured grants that should be deactivated should be released for use by other communications devices.

Embodiments of the present technique, which further relate to communications devices, infrastructure equipment, methods of operating infrastructure equipment, and circuitry for communications devices and infrastructure equipment, allow for the enhancement of resource efficiency at a gNodeB so that CG resources are activated when there are transmissions from a UE and deactivated when there are no transmissions from a UE.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
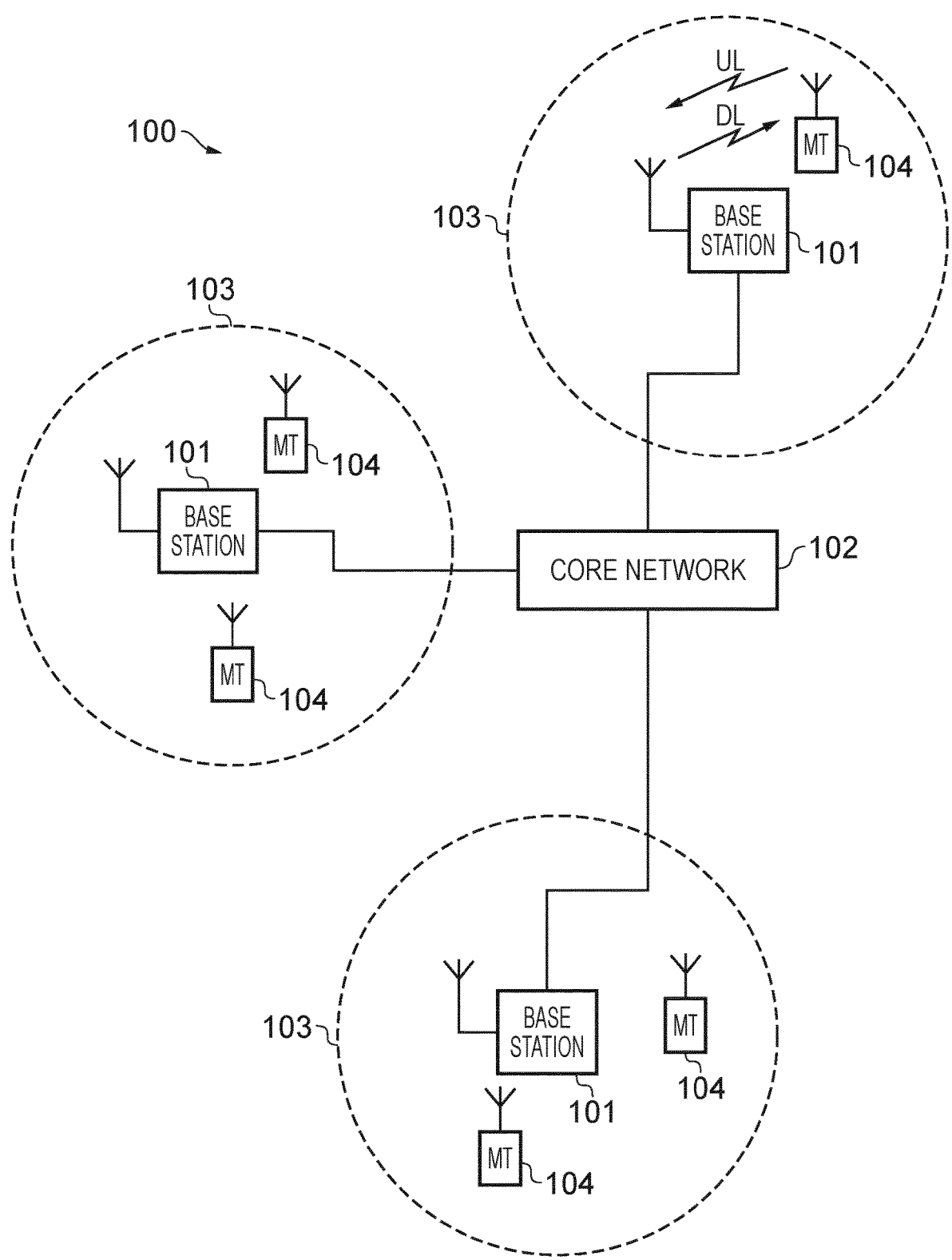
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink (DL). Data is transmitted from terminal devices 104 to the base stations 101 via a radio uplink (UL). The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
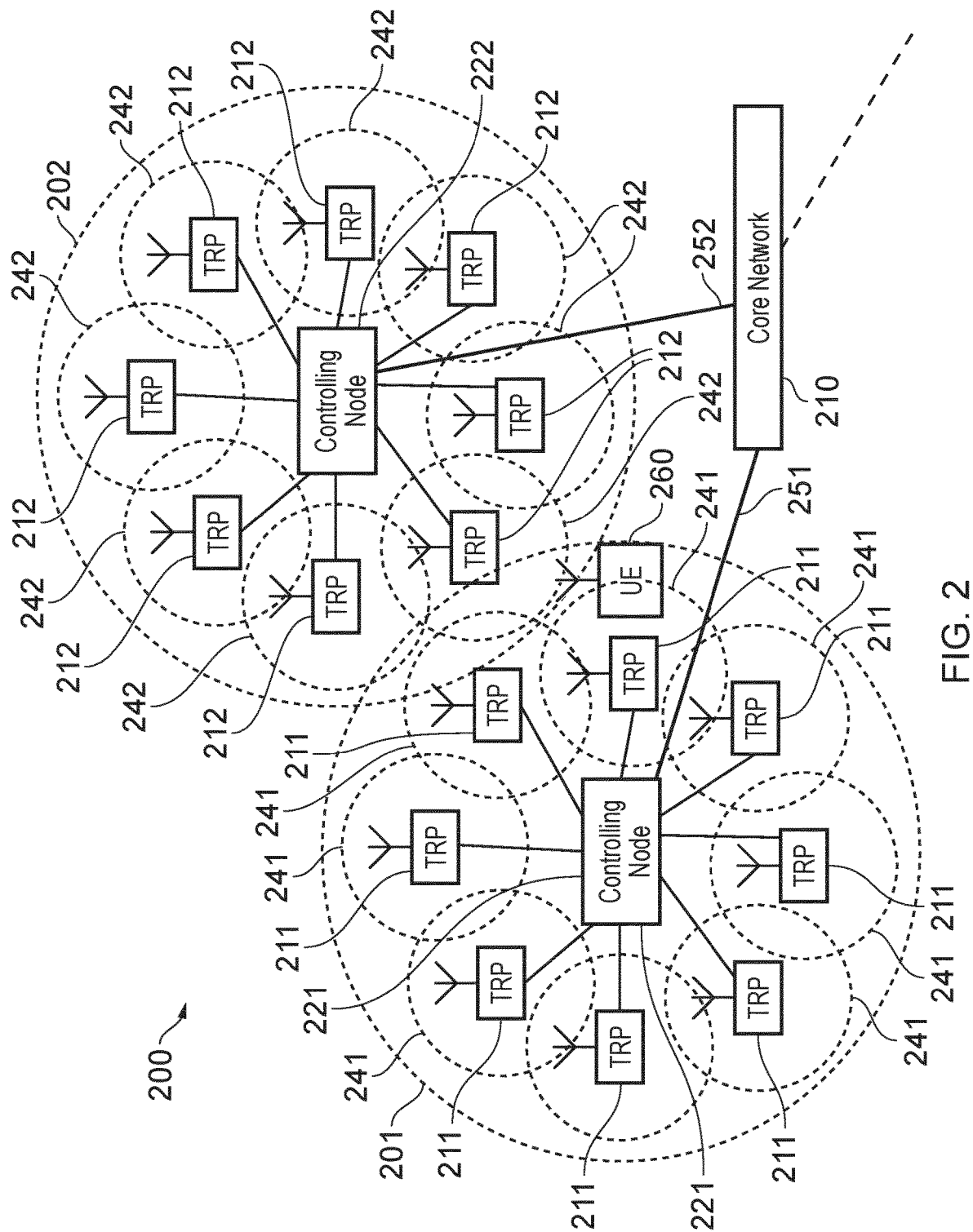
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units (DUs) 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
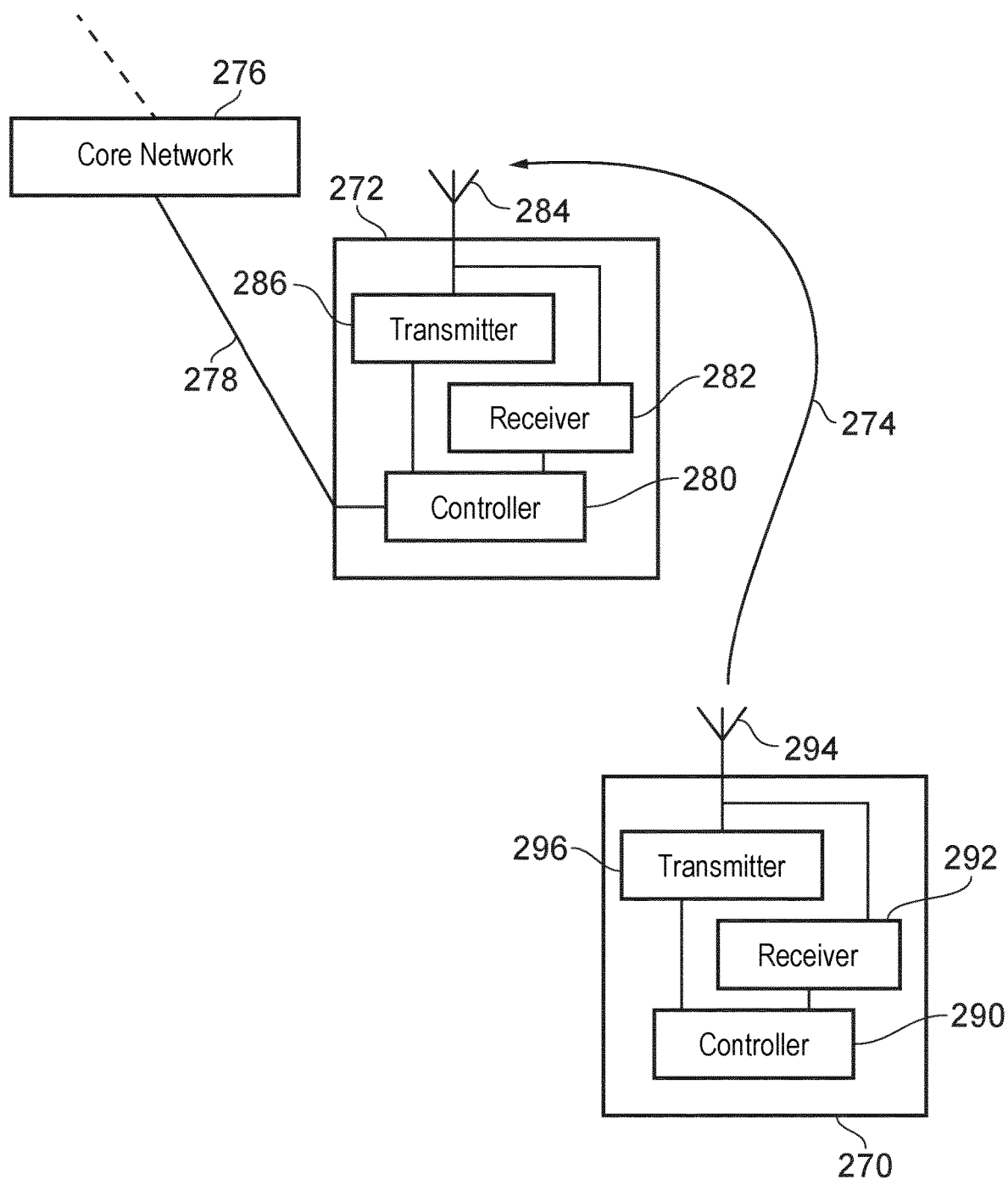
FIG. 3 is a schematic block diagram of an example infrastructure equipment and communications device which may be configured to operate in accordance with certain embodiments of the present disclosure.

A more detailed illustration of a UE 270 and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via resources of a wireless access interface as illustrated generally by an arrow 274. The UE 270 may similarly be configured to receive downlink data transmitted by the infrastructure equipment 272 via resources of the wireless access interface (not shown). As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

5G, URLLC and Industrial Internet of Things

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable & Low Latency Communications (URLLC) services are for a reliability of $1\text{-}10^{-5}$ (99.999%) or higher for one transmission of a 32 byte packet with a user plane latency of 1 ms [3]. In some scenarios, there may be a requirement for a reliability of $1\text{-}10^{-6}$ (99.9999%) or higher. Massive Machine Type Communications (mMTC) is another example of a service which may be supported by NR-based communications networks. In addition, systems may be expected to support further enhancements related to Industrial Internet of Things (IIoT) in order to support services with new requirements of high availability, high reliability, low latency, and in some cases, high-accuracy positioning.

Industrial automation (i.e. the future factory), energy power distribution and intelligent transport systems are examples of new use cases for Industrial Internet of Things (IIoT). In an example of industrial automation, the system may involve different distributed components working together. These components may include multiple sensors, virtualised hardware controllers and autonomous robots, which may be capable of initiating actions or reacting to critical events occurring within a factory and communicating over a local area network. The local area network may handle messages which are time sensitive and have strict time deadlines, and may thus be referred to as a time sensitive network (TSN). Some parts of this TSN network can be interconnected by 5G wireless system (5GS). The UEs/equipment in a TSN network may be expected to handle a mixture of the following different traffic [4]:

Multiple periodic streams, of different periodicities, of different priorities, for example multiple streams coming from different applications;

Aperiodic critical priority traffic that is the result of critical events, like alarms, safety detectors that need to be informed about the occurrence of a critical event; and Best effort type of traffic such as eMBB traffic, internet traffic, or any other traffic supporting factory operations.

Details of possible use cases and scenarios may be found in [4], from which Table I, on the next page, detailing these use cases is reproduced.

The UEs/equipment in the network may therefore be expected to handle a mixture of different traffic, for example, associated with different applications and potentially different quality of service requirements (such as maximum latency, reliability, packet sizes, throughput, etc.). In order to permit a communications device to transmit data associated with multiple traffic classes in a timely manner, multiple configured grants/semi-persistent scheduling (SPS) grants may be required in order to provide more flexibility while avoiding excessive dynamic downlink control signalling. It has been suggested [5] that multiple active configured grants allocating resources in a given bandwidth part (BWP) of a serving cell can be supported simultaneously at least for different services/traffic types and/or for enhancing reliability and reducing latency.

TABLE I

Use cases and requirements considered for TSN requirements evaluation

| Case | #UE | Communications service availability | Transmit period | Allowed E2E latency | Survival time | Packet size | Service area | Traffic periodicity | Use case |
|------|-----|------|------|------|------|------|------|------|------|
| I | 20 | 99.9999% to 99.999999% | 0.5 ms | ≤Transmit period | Transmit period | 50 bytes | 15 m × 15 m × 3 m | Periodic | Motion control and control-to-control use cases |
| II | 50 | 99.9999% to 99.999999% | 1 ms | ≤Transmit period | Transmit period | 40 bytes | 10 m × 5 m × 3 m | Periodic | Motion control and control-to-control use cases |
| III | 100 | 99.9999% to 99.999999% | 2 ms | ≤Transmit period | Transmit period | 20 bytes | 100 m × 100 m × 30 m | Periodic | Motion control and control-to-control use cases |

There is therefore a need to ensure that a communications device can be appropriately configured to transmit data using resources associated with one or more configured grants in an appropriate manner, respecting the quality of service requirements for the data.

MAC Control Elements

Data may be transmitted by a communications device 104, 260 using uplink communications resources using a medium access control (MAC) control element (CE). Each MAC CE is constructed at a MAC protocol in response to determining that uplink communications resources are, or will be, scheduled for the communications device and that data is available for uplink transmission. Once the MAC CE is constructed, it may be passed from the MAC protocol layer to the PHY protocol entity for transmission on the wireless access interface to the infrastructure equipment.

Bandwidth Parts (BWP)

A communications device and an infrastructure equipment, such as the communications device 104 and infrastructure equipment 101 of FIG. 1 or the communications device 260 and infrastructure equipment (TRP) 211, 212 of FIG. 2, are configured to communicate via a wireless access interface. The wireless access interface may comprise one or more carriers, each providing, within a range of carrier frequencies, communications resources for transmitting and receiving signals according to a configuration of the wireless access interface. The one or more carriers may be configured within a system bandwidth provided for the wireless communications network of which the infrastructure equipment 101, 211, 212 forms part. Each of the carriers may be divided in a frequency division duplex scheme into an uplink portion and a downlink portion and may comprise one or more bandwidth parts (BWPs). A carrier may be configured therefore with a plurality of different BWP for a communications device to transmit or receive signals. The nature of the wireless access interface may be different amongst the different BWPs. For example, where the wireless access interface is based on orthogonal frequency division multiplexing, different BWPs may have different sub-carrier spacing, symbol periods and/or cyclic prefix lengths. BWPs may have different bandwidths.

By configuring BWPs appropriately, the infrastructure equipment may provide BWPs which are suited for different types of services. For example, a BWP more suitable for eMBB may have a larger bandwidth in order to support high data rates. A BWP suited for URLLC services may use a higher sub-carrier spacing and shorter slot durations, in order to permit lower latency transmissions. Parameters of the wireless access interface which are applicable to a BWP may be referred to collectively as the numerology of a BWP. Examples of such parameters are sub-carrier spacing, symbol and slot durations and cyclic prefix length.

A BWP may comprise communications resources for uplink or downlink communications. For a communications device, an uplink (UL) BWP and a downlink (DL) BWP may be independently configured, and an association (e.g. pairing) of an UL BWP and a DL BWP may be configured. In some examples, uplink and downlink communications resources are separated in time, in which case time division duplexing (TDD) may be used. In case of TDD, a BWP-pair (UL BWP and DL BWP with the same bwp-id) may have the same centre frequency. In some examples uplink and downlink communications resources are separated in frequency, in which case frequency division duplexing (FDD) may be used. Where FDD is used, a UL BWP and a DL BWP may comprise two non-contiguous frequency ranges, one comprising communications resources for uplink communications and one comprising communications resources for downlink communications. In the remainder of the present disclosure, the term 'bandwidth part' (BWP) is used to refer to a pair of associated uplink and downlink bandwidth parts and as such, may comprise communications resources for both uplink and downlink transmissions. The terms 'uplink bandwidth part' and 'downlink bandwidth part' will be used where appropriate to refer to a bandwidth part comprising only, respectively, uplink communications resources and downlink communications resources.

An activated BWP refers to a BWP which may be used for the transmission or reception of data to or from the communications device 104, 260. An infrastructure equipment 101, 211, 212 may schedule transmissions to or by the communications device 104, 260 only on a BWP if that BWP is currently activated for the communications device 104, 260. On deactivated BWPs, the communications device 104, 260 may not monitor a PDCCH and may not transmit on PUCCH, PRACH and UL-SCH. Conventionally at most one BWP providing uplink communications resources and at most one BWP providing downlink communications resources may be activated at any given time in respect of a particular communications device.

In light of the differing parameters which may be applicable to BWPs, a single activated BWP may not be suitable for the transmission of data associated with different services, if those different services have different requirements (e.g. latency requirements) or characteristics (e.g. bandwidth/data rate). Prior to being activated, a BWP may be configured for use by the communications device 104, 260. That is, the communications device 104, 260 may determine the characteristics of the BWP, for example, by means of radio resource control (RRC) signalling transmitted by the infrastructure equipment 101.

A BWP may be designated as an initial downlink BWP, which provides the control resource set for downlink information used to schedule downlink transmissions of system information, and a corresponding initial uplink BWP for uplink transmissions for example for initiating PRACH transmission for initial access. A BWP may be designated as a primary BWP which is always activated and which may be used for transmitting control information to or by the communications device 104, 260. Since the primary BWP is always activated and thus may be used for data transmission, it may only be necessary to activate one or more further (secondary) BWPs if the primary BWP is unsuitable for an ongoing or new service or insufficient e.g. due to congestion or lack of bandwidth. Alternatively or additionally, a BWP may be designated as a default BWP. If no BWP is explicitly configured as a default BWP, a BWP which is designated as the initial BWP may be the default BWP.

A default BWP may be defined as a BWP that a UE falls back to after an inactivity timer, associated with a BWP other than the default BWP, expires. For example, where a non-default BWP is deactivated as a result of an associated inactivity timer expiring, and no other non-default BWP is activated, then a default BWP may be activated in response. A default BWP may have an activation or deactivation priority which differs from the activation or deactivation priority of other, non-default, BWPs. A default BWP may be preferentially activated and/or may be deactivated with lowest preference. For example, a default BWP may remain activated unless and until a further BWP is to be activated such that a maximum number of activated BWPs would be exceeded. A default BWP may further be preferentially used for transmitting an indication that a different BWP is to be activated or de-activated.

Grant Based and Grant Free Resources

In a conventional uplink transmission, when data arrives from upper protocol layers at a buffer at the medium access control (MAC) protocol layer of the communications device, the communications device may transmit, in response, a Scheduling Request (SR) to the network if the communications device has no uplink transmission/resources scheduled. The communications device may transmit a buffer status report (BSR), indicating an amount of data in the MAC layer buffer(s). In response to receiving the SR or BSR, the network (for example, the infrastructure equipment 101) may send an Uplink Grant carried by downlink control information (DCI) to the communications device 104. The DCI may be transmitted on a physical downlink control channel (PDCCH).

The Uplink Grant may comprise an indication of uplink communications resources which are allocated (or, in other words, scheduled) for the communications device to transmit its uplink data. The uplink communications resources may be on a physical uplink shared channel (PUSCH). A resource allocation of this type, where resources are allocated on an ad-hoc, one-off basis, may be known as a grant based resource or 'dynamic grant' (DG). Grant based resources are suitable for services where the data arrives in variable amounts, and/or is aperiodic, even if the data traffic arrival follows a somewhat predictable traffic pattern. DGs may be signalled at the MAC layer.

On the other hand, grant free resources are a set of periodically repeating uplink communications resources which are semi-statically configured by the network for the use of the communications device for uplink transmission. Such resources may also be referred to as a "configured grant" (CG). Grant free resource allocation (which may also be referred to as "semi-persistent scheduling" (SPS)) is particularly suitable for services that generate periodic data traffic, where the amount generated is broadly constant over time. CGs may be signalled at a radio resource control (RRC) layer. Grant free resources can improve the efficiency with which communications resources are used, since there is no need for either a SR or uplink grants to be transmitted in respect of each uplink data transmission.

Resource allocations may thus be provided in accordance with quality of service requirements associated with particular services. Where a single communications device generates data for transmission which comprises data associated with different quality of service requirements, for example because it is associated with different services, the communications device may receive multiple resource allocations. These multiple resource allocations may comprise zero, one or more dynamic grants, and zero, one or more configured grants. A communications device may thus have multiple active grants. Communications resources allocated by these grants may in some instances coincide, for example in the time domain, the frequency domain, or both.

Multiple Configured Grants

As discussed above, the UEs in networks such as TSNs should handle a mixture of different traffic. This means that there should be available resources for the UE to deliver multiple traffic classes in a timely manner. Hence, multiple CG/SPS should be designed in order to provide more flexibility and less resource wastage due to reduction of dynamic downlink control signalling. There have already been agreements within 3GPP RAN1 that multiple active CGs in a given bandwidth part (BWP) of a serving cell can be supported simultaneously at least for different services/traffic types and/or for enhancing reliability and reducing latency [5].

Currently there are two types of configured grants, Type 1 and 2. For configured Type 1 (CG Type 1), all transmission parameters such as resource block allocation (i.e. number of RBs), MCS table, MCS index and periodicity are configured by RRC signalling, and resources are always reserved so that the UE can transmit whenever it has data. For Configured Type 2 (CG Type 2), some of the parameters are configured by RRC signalling, such as MCS table and periodicity, but downlink control information (DCI) also provides additional parameters, such as MCS index and resource block allocation (i.e. number of RBs). Furthermore, the DCI received from a gNB dynamically activates the resources for CG Type 2 when there is data for transmission, and deactivates these resources when they are not needed.

In Rel-15, either CG Type 1 or CG Type 2 is supported in a given bandwidth part (BWP), but not both simultaneously. In addition, only a single instance of each type is supported; hence multiple CGs are not supported in Rel-15.

In Rel-16, it has been agreed to support multiple active configured grants for a UE in a given bandwidth part (BWP) of a serving cell. This means that multiple CGs (up to 12) of Type 1 or Type 2 are supported in a BWP. For CG Type 2, the activation and deactivation of multiple CGs is done via DCI signalling from the gNB. However for CG Type 1, there is no activation and deactivation of multiple CGs. This is problematic, in that it is not efficient for resources to be always reserved even when there is no data transmission from the UE for a period of time, or such radio resources are no longer required due to change in UE conditions, meaning that gNB cannot schedule to other UEs on the same UL resources.

For CG Type 1, the main issue is how to enhance the resource efficiency at the gNB so that the CG resources are activated when there is a transmission and deactivated when there is no transmission from the UE. Some use cases justifying for enhancing CG Type 1 with multiple resources are as follows:

a) A UE may have multiple services with different traffic characteristics such as periodicity, reliability and priority. Therefore, each set of CG resources can be assigned to a different service.

When the UE does not have any data for transmission from a given service, the corresponding set of CG resources must be released;

b) A UE may have multiple sets of CG resources for a single service (i.e. one logical channel) intended to mitigate radio channel fluctuations, so that each set of CG resources has a different MCS level. Therefore when channel condition is stable for some time, the unused set of CG resources must be released;

c) A UE may have multiple sets of CG resources starting at different times (e.g. an offset from each other) for a single service (i.e. one logical channel) intended to mitigate traffic arrival delays (i.e. jitter). Hence, when the traffic arrival delay is small/insignificant for some time (for example fewer than X OFDM symbols or X μs), then some of the sets of CG resources are released. However, when the traffic arrival delay is significant (for example more than X OFDM symbols or X μs), the UE can keep some or all of the sets of CG resources activated; and d) A UE may have multiple sets of CG resources with repetitions starting at different times (e.g. an offset from each other) for a single service (i.e. one logical channel) intended to mitigate radio channel fluctuations as well as traffic arrival delays. Therefore when some of the sets of CG resources are not used for some time, they must be released.

In Rel-15, the signalling mechanism to activate or release the CG resources falls into one of the following:

RRC signalling is used to allocate or release CG resources, is applicable to both DL and UL resources, and is currently used for both CG Type 1 and 2; and DCI is used to activate or deactivate resources which have already been allocated by RRC signalling, is applicable to both DL and UL resources, and is currently used for CG Type 2 and DL SPS.

Enhancements of UL Configured Grant for IIoT/URLLC in 5G Systems

Figure 4:
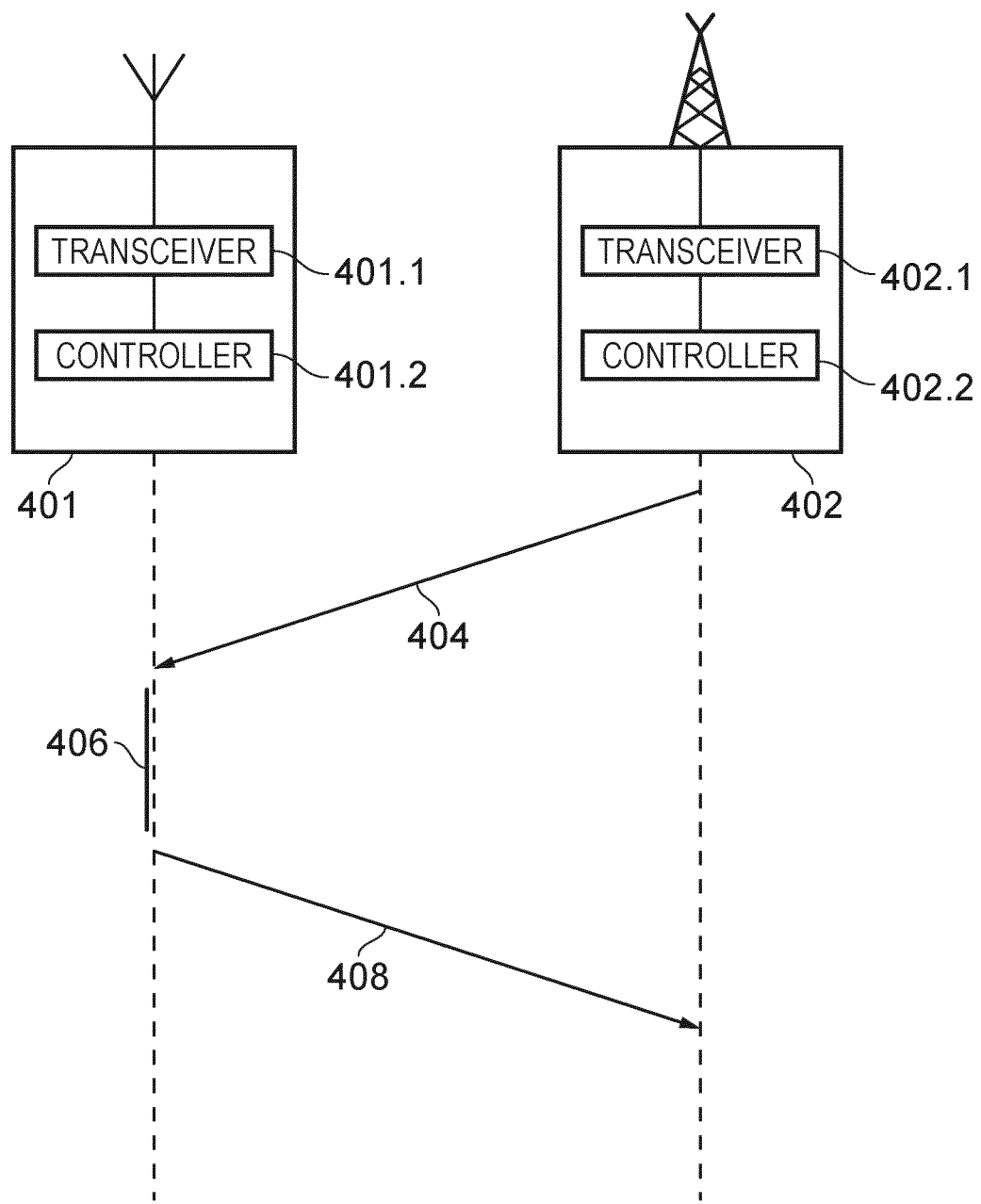
FIG. 4 shows a part schematic, part message flow diagram representation of a wireless communications network comprising a communications device and an infrastructure equipment in accordance with embodiments of the present technique.

FIG. 4 shows a part schematic, part message flow diagram representation of a wireless communications network comprising a communications device 401 and an infrastructure equipment 402 in accordance with embodiments of the present technique. The communications device (401) is configured to transmit data to the infrastructure equipment 402 in a cell of the wireless communications network. The communications device 401 and the infrastructure equipment 402 each comprise a transceiver (or transceiver circuitry) 401.1, 402.1, and a controller (or controller circuitry) 401.2, 402.2. Each of the controllers 401.2, 402.2 may be, for example, a microprocessor, a CPU, or a dedicated chipset, etc.

The transceiver circuitry 401.1 and the controller circuitry 401.2 of the communications device 401 are configured in combination receive 404 an indication of a plurality of configured grants from the infrastructure equipment 402, each of the configured grants allocating a set of communications resources for the transmission of the data by the communications device 401 within one of a plurality of bandwidth parts defining a frequency range within a system bandwidth of the cell, to determine 406 that one or more of the plurality of configured grants should be activated and/or to determine that one or more of the plurality of configured grants should be deactivated, and to transmit 408, to the infrastructure equipment 402, one or both of an activation signal if the communications device 401 determines that one or more configured grants should be activated and a deactivation signal if the communications device 401 determines that one or more configured grants should be deactivated, wherein the activation signal indicates that the set of communications resources of each of the one or more configured grants that should be activated should be reserved for use by the communications device 401, and the deactivation signal indicates that the set of communications resources of each of the one or more configured grants that should be deactivated should be released for use by other communications devices.

Both the communications device 401 and the infrastructure equipment 402 can initiate the activation/deactivation procedure. When the infrastructure equipment 402 initiates the activation/deactivation procedure (this is not shown in FIG. 4, which shows the communications device 401 initiating the procedure), the controller circuitry 402.2 and transceiver circuitry 402.1 of the infrastructure equipment 402 are configured in combination to transmit an indication of a plurality of configured grants to the communications device 401, each of the configured grants allocating a set of communications resources for the transmission of data by the communications device 401 to the infrastructure equipment 402 within one of a plurality of bandwidth parts defining a frequency range within a system bandwidth of the cell, to determine that one or more of the plurality of configured grants should be activated and/or to determine that one or more of the plurality of configured grants should be deactivated, and to transmit, to the communications device 401, one or both of an activation signal if the infrastructure equipment 402 determines that one or more configured grants should be activated and a deactivation signal if the infrastructure equipment 402 determines that one or more configured grants should be deactivated, wherein the activation signal indicates that the set of communications resources of each of the one or more configured grants that should be activated should be reserved for use by the communications device 401, and the deactivation signal indicates that the set of communications resources of each of the one or more configured grants that should be deactivated should be released for use by other communications devices.

In some embodiments, the one or both of the activation signal and the deactivation signal may be carried in Medium Access Control, MAC, Control Elements, CEs transmitted by the communications device to the infrastructure equipment when the communications device initiates the activation/deactivation procedure or in MAC CEs transmitted by the infrastructure equipment to the communications device when the infrastructure equipment initiates the activation/deactivation procedure.

For CG Type 1, there are stringent latency requirements that are associated with IIoT applications, and so the methods for activating CG Type 1 in particular should allow this to be done as fast as possible (it should be appreciated by those skilled in the art that embodiments of the present technique equally apply for CG Type 2 or any other conceivable configured grant type as they do for CG Type 1). Since embodiments of the present technique provide multiple CGs of Type 1 on the same BWP for different traffic profiles, it is mostly unlikely to deactivate all the CGs at the same time. The criteria for activation/deactivation for each use case are:

- Traffic flow detection can be performed either in the gNB or the UE and activation and/or deactivation of each CG resource, based on traffic conditions, for Type 1 can be signalled using either RRC or MAC CE layer signalling or a timer as detailed below. For the UE based approach, criteria may be signalled by the base station to activate and/or deactivate different CGs, e.g. based on amount of data in the buffer or packet delay budget requirements. As described above, both the UE and gNB can initiate the activation/deactivation procedure. However, it is faster for UL transmissions when UE initiates the activation/deactivation procedure;
- Both UE and gNB can determine the UE radio conditions (e.g. based on CQI level reported by the UE to the gNB). If UE radio conditions have improved compared to the last CSI report (e.g. CQI), then fewer CG resources could be used. The UE may perform its own measurements and the gNB may determine based on RRM and CSI measurements and perform activation and/or deactivation. A threshold value may be indicated to the UE if UE is initiating activation/deactivation;
- The UE may be configured to activate/deactivate different CG resources based on jitter tolerance. If, for example, jitter is above a certain limit on the received packets then all configured CG resources could be used. When jitter tolerance is at an intermediate level, then less than the configured amount of CG resources can be used. For UL traffic, jitter tolerance is detected at the gNB or application layer and fed back to the base station which may trigger activation/deactivation of CG resources. For the UE based approach, the UE may be signalled the criteria; e.g. the jitter tolerance level for different CG configurations.

Signalling Details

Some of the CGs will have lots of activity while others have less or no activity at a given time. In fact, there may not be a CG that is always busy with transmissions, but it is possible to identify a CG that has been configured with the shortest periodicity. The CG with the shortest periodicity can provide the shortest latency in terms of delivering the activation and deactivation messages to the gNB. In embodiments of the present technique this CG is termed a "leading CG (LCG)" and remaining CGs are just "associate CGs (ACG)".

When there are two or more CGs on the same BWP for the UE, one of the CGs is labelled as a leading CG (LCG). The LCG must be the one with shortest periodicity in order to provide the lowest latency. The communications device or the infrastructure equipment (depending on which is initiating the activation/deactivation procedure) determines that one of the plurality of configured grants is a leading configured grant and that the others of the plurality of configured grants to the leading configured grants are associate configured grants, the leading configured grant having a shortest periodicity among the plurality of configured grants.

The LCG is the CG that carries the MAC CE Activation and Deactivation messages of other associate CGs as well as its data to gNB. In other words, the one or both of the activation signal and the deactivation is transmitted within the set of communications resources of the leading configured grant. The gNB can take into account the extra load when allocating resources for the LCG.

Figure 5:
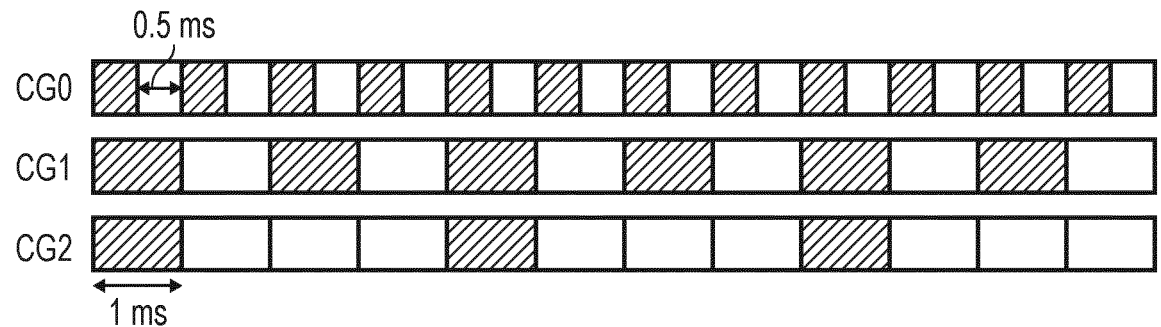
FIG. 5 shows an example of multiple sets of uplink configured grant resources having different periodicities in accordance with embodiments of the present technique.

As shown in FIG. 5, three configured grants CG0, CG1 and CG2 are configured for a UE on a BWP of the serving cell, with periodicities of 1 ms, 2 ms and 4 ms respectively, assuming a 15 KHz subcarrier spacing and normal cyclic prefix (CP). In this case, CG0 should be designated to be the leading CG (LCG) because it has the shortest periodicity and the remaining CG1 and CG2 are just associate CGs (ACG).

In an arrangement of embodiments of the present technique, when there are multiple CGs with same short periodicities at the UE, the CG with lowest index is promoted autonomously to be an LCG. In other words, if two or more of the plurality of configured grants have the same periodicity, the communications device or infrastructure equipment determines that the one of the two or more of the plurality of configured grants having a lowest unique identifier among the two or more of the plurality of configured grants is the leading configured grant.

In an arrangement of embodiments of the present technique, when there are multiple CGs with same short periodicities, the gNB indicates to the UE which CG would be acting as an LCG. In other words, if two or more of the plurality of configured grants have the same periodicity, the infrastructure equipment determines which of these is the leading configured grant, and the communications device receives an indication from the infrastructure equipment of which of the two or more of the plurality of configured grants is the leading configured grant. The gNB may alternatively indicate to the UE which of the CGs may be the LCG regardless of periodicity entirely. In other words, the communications device is configured to receive, from the infrastructure equipment, an indication that one of the plurality of configured grants is a leading configured grant and that the others of the plurality of configured grants to the leading configured grants are associate configured grants.

In an arrangement of embodiments of the present technique, instead of applying concept of LCG and ACG, any CG can carry or deliver the activation and deactivation messages to the gNB (or to the UE if the gNB initiates the activation/deactivation procedure). In other words, the communications device or infrastructure equipment is able to transmit the one or both of the activation signal and the deactivation within the set of communications resources of any of the plurality of configured grants.

When deactivating a CG, the deactivation message could contain the index/ID of the CG to be deactivated. By the same token, when activating a CG, the activation message could contain the index/ID of the CG to be activated. In other words, the activation signal comprises a unique identifier of each of the one or more configured grants that should be activated, and the deactivation signal comprises a unique identifier of each of the one or more configured grants that should be deactivated. Alternatively, a bitmap can be used to activate or deactivate one or more CGs where each bit indicates the activation/deactivation status of a specific CG index, for example "1" for activation and "0" for deactivation. In other words, the activation signal and deactivation signal each comprise a bitmap formed of a plurality of bits each associated with one of the plurality of configured grants, a value of each of the plurality of bits indicating whether the associated configured grant should be activated or deactivated.

In the present disclosure, both deactivation and activation information may be transmitted from either of the UE or gNB to the other. However, deactivation and activation information transmitted from the UE to the gNB is best able to reduce the delay and enable fast delivery of IIoT data subsequently. A timer (which may termed, for example, ConfiguredGrantTimer) may be used for the reception of acknowledgements at the UE, meaning that if gNB did not provide a negative acknowledgement (NACK) within the period of time specified by the timer (i.e. same as legacy CG Type 1 in Rel-15), the UE will assume the message has been delivered successfully to the gNB. Then the UE can start using the activated CG resources immediately after timer expires. If the gNB does provide a NACK, which may be just by sending retransmission grant/DCI containing the same HARQ process as in the last transmitted UL CG, the UE will retransmit the same message. In other words, the communications device is configured to start a timer upon transmission of the one or both of the activation signal and the deactivation signal, to determine, on expiry of the timer, if a negative acknowledgement has been received from the infrastructure equipment, the negative acknowledgement indicating that the one or both of the activation signal and the deactivation signal has not been successfully received by the infrastructure equipment, and if the negative acknowledgement has been received, to retransmit the one or both of the activation signal and the deactivation signal, or if the negative acknowledgement has not been received, to transmit the data within the set of communications resources of each of the one or more configured grants indicated in the activation signal and/or ceasing transmission of the data within the set of communications resources of each of the one or more configured grants indicated in the deactivation signal.

Furthermore, it is also possible for the gNB to feedback only a positive acknowledgement (ACK) by sending a grant/DCI containing the confirmation message of successful "activation/deactivation" of the CG resource. Here, the communications device is configured to start a timer upon transmission of the one or both of the activation signal and the deactivation signal, to determine, on expiry of the timer, if an acknowledgement has been received from the infrastructure equipment, the acknowledgement indicating that the one or both of the activation signal and the deactivation signal has been successfully received by the infrastructure equipment, and if the acknowledgement has not been received, to retransmit the one or both of the activation signal and the deactivation signal, or if the acknowledgement has been received, to transmit the data within the set of communications resources of each of the one or more configured grants indicated in the activation signal and/or ceasing transmission of the data within the set of communications resources of each of the one or more configured grants indicated in the deactivation signal.

Figure 6:
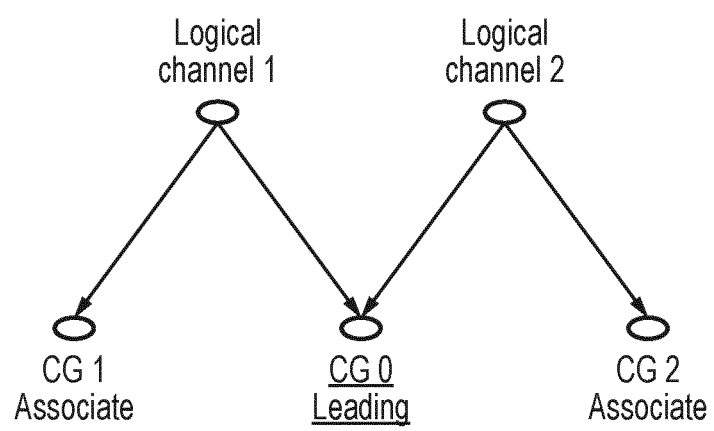
FIG. 6 shows an example of a logical channel being mapped to one or more sets of configured grant resources in accordance with embodiments of the present technique.

In the above discussion, and in known techniques, it is assumed that a logical channel is mapped to one configured grant resource. However, in order to increase the availability of the CG resources for a given logical channel, especially when a CG is temporarily deactivated, a logical channel could be associated to one or more active CG resources as shown in FIG. 6. In this case, one of the active CG resources associated to a logical channel should be the leading CG (LCG) as the LCG is not intended to ever be deactivated unless its existence is de-configured by RRC signalling. Therefore, the resources for LCG can be used whenever other associate CG resources are deactivated and suddenly there is data available for transmission. A number of CGs associated with the same logical channel can be defined as a group. However, the leading CG (LCG) can belong to one or more groups as shown in FIG. 6, where CG1 and CG0 are in one group, and CG2 and CG0 are in another group. Hence, CG0 is an LCG and belongs to both groups, taking care of activation and deactivation of both groups. Those skilled in the art would appreciate that FIG. 6 just shows an example, and there could be a larger number of logical channels and groups of CGs, and an LCG may belong to all of this larger number of groups. Here, the communications device may be configured to receive, from the infrastructure equipment, an indication of an association between each of one or more logical channels and a group of two or more of the configured grants, wherein the leading configured grant forms a part of the group of configured grants associated with each of the logical channels.

In an arrangement of embodiments of the present technique, each CG has an associated inactivity timer, and when there is a long period of inactivity for a CG resource, that CG is deactivated automatically. An inactivity timer is started/re-started whenever there is a transmission in the uplink for a given CG resource. In other words, each of the configured grants is associated with an inactivity timer that is restarted upon each transmission of data by the communications device within the set of communications resources of the configured grant associated with the inactivity timer, and the determining that one or more of the plurality of configured grants should be deactivated comprises determining that the inactivity timer associated with each of the one or more configured grants that should be deactivated has expired. The gNB would also apply similar timer in order to be aligned with the UE when the CG resources are released. The gNB can dynamically assign these resources to other UEs when resources are released, hence increasing the resource efficiency within the cell. In other words, the infrastructure equipment is configured to transmit an allocation message to at least one other communications device after transmitting the deactivation signal, the allocation message indicating that the at least one other communications device may transmit data within the set of communications resources of each of the one or more configured grants indicated in the deactivation signal. When a UE has data to transmit it will send an activation message to gNB using MAC CE and start using the activated CG resources immediately.

Another way of UE indicating an activation of one or more CG resources is to send a Scheduling Request (SR) or Buffer Status Report (BSR) to the gNB. In the current NR, each SR configuration corresponds to one or more logical channels, and each logical channel may be mapped to zero or one SR configuration, which is configured by RRC signalling. Hence, when data for a logical channel is available, the UE transmits the corresponding SR (carried on a PUCCH) for informing the gNB. In addition, BSR (carried on MAC CE) can be used to report the data available for a particular logical channel Therefore, in embodiments of the present technique, when the UE sends a SR/BSR, it is understood at the gNB that the UE has activated the CG resources (i.e. one or more CGs) associated to the logical channel(s) mapped in the SR/BSR. In other words, the activation signal is one of a scheduling request and a buffer status report indicating that the communications device requires more communications resources within which to transmit data, wherein the one of the scheduling request and the buffer status report is associated with one or more logical channels which are associated with the one or more configured grants that should be activated. The UE can therefore start using the activated CG resources immediately after the acknowledgement timer (ConfiguredGrantTimer) expires or as soon as the UE receives an explicit acknowledgement, thus avoiding delay and increasing efficiency.

In an arrangement of embodiments of the present technique, an RRC signalling mechanism may be utilised, which includes configuration of two or more CG resources, e.g. 3 CGs, and also includes the criteria for enabling/activating or deactivating each of these CGs. For example, if UE is in bad radio conditions then all 3 CGs are used. If UE radio conditions improve by a factor (e.g. based on CQI level or RSRP) then only 2 CGs are used. For example:

CG Config #0
   Criteria to use CG #0 (e.g. jitter tolerance level, traffic inactivity duration, CQI level)
CG Config 1
   Criteria to use CG #1 (e.g. jitter tolerance level, traffic inactivity duration, CQI level)
CG Config 2
   Criteria to use CG #2 (e.g. jitter tolerance level, traffic inactivity duration, CQI level)

In other words, the determining that one or more of the plurality of configured grants should be activated is dependent on one or more specified communications conditions. The one or more specified communications conditions may comprise:
- a relative quality of signals transmitted or received within the set of communications resources of each of the one or more configured grants that should be activated is above a threshold value;
- a reference signal received power of a reference signal received within the set of communications resources of each of the one or more configured grants that should be activated is above a threshold value;
- a jitter tolerance level of signals transmitted or received within the set of communications resources of each of the one or more configured grants that should be activated is above a threshold value; and
- an average amount of data for transmission by the communications device per activated configured grant is above a threshold value.

Equally, the determining that one or more of the plurality of configured grants should be deactivated is dependent on one or more specified communications conditions. The one or more specified communications conditions may comprise:
- a relative quality of signals transmitted or received within the set of communications resources of each of the one or more configured grants that should be deactivated is below a threshold value;
- a reference signal received power of a reference signal received within the set of communications resources of each of the one or more configured grants that should be deactivated is below a threshold value;
- a jitter tolerance level of signals transmitted or received within the set of communications resources of each of the one or more configured grants that should be deactivated is below a threshold value; and
- a duration over which no data has been transmitted by the communications device within the set of communications resources of each of the one or more configured grants that should be deactivated is above a threshold value.

Those skilled in the art would appreciate that such an arrangement of embodiments of the present technique could be applied to any number of CGs, and any combination of parameters and any values of thresholds.

The parameters related to criteria for different CGs should typically be set to different values. For example, if radio conditions are greater than threshold-1, then use CG0. If radio conditions are greater than threshold-2 but less than threshold-1, then use both CG0 and CG1. If radio conditions are less than threshold-2 then all 3 CG resources are used for repetitions. The thresholds and indeed the parameters themselves can be signalled via RRC to the UE. In other words, the one or more specified conditions and the threshold values for each of the one or more specified conditions are indicated to the communications device by the infrastructure equipment. The benefit of this approach is that the legacy Type 1 is configured by RRC and does not require any explicit signaling in lower layers. The UE and gNB are aligned about which resources are active/released based on monitoring the criteria for enabling for activating and deactivating for each CG resource.

In another arrangement of embodiments of the present technique, similarly to LTE and Rel-15 NR, DCI signaling from the gNB indicates the activation and or deactivation of a UL CG resource for CG Type 2. In other words, the one or both of the activation signal and the deactivation signal is carried in downlink control information transmitted by the infrastructure equipment to the communications device.

It should be appreciated by those skilled in the art that some of the signalling methods described herein can be applied for DL SPS activation and deactivations as well.

Flow Chart Representation

Figure 7:
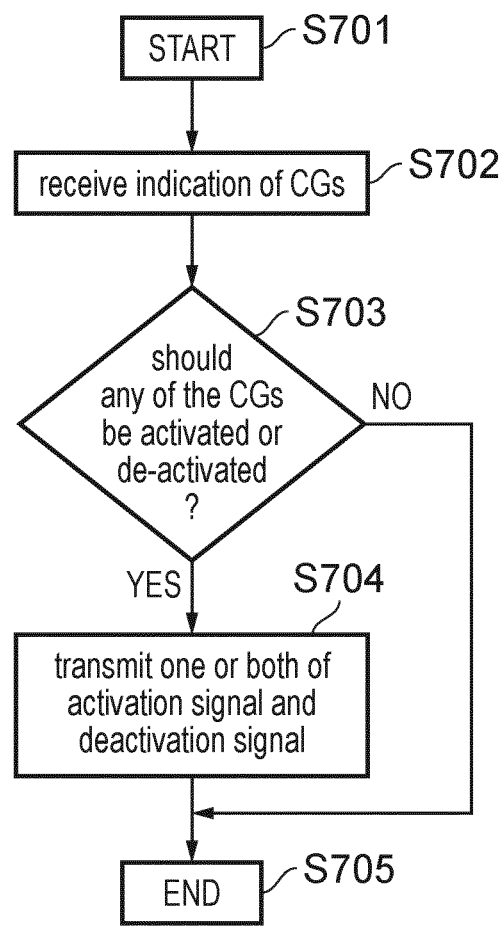
FIG. 7 shows a flow diagram illustrating a process of communications in a communications system in accordance with embodiments of the present technique.

FIG. 7 shows a flow diagram illustrating a process of communications in a communications system in accordance with embodiments of the present technique. The process shown by FIG. 7 is a method for transmitting data by a communications device to an infrastructure equipment in a cell of a wireless communications network.

The method begins in step S701. The method comprises, in step S702, receiving an indication of a plurality of configured grants from the infrastructure equipment, each of the configured grants allocating a set of communications resources for the transmission of the data by the communications device within one of a plurality of bandwidth parts defining a frequency range within a system bandwidth of the cell. In step S703, the method comprises determining that one or more of the plurality of configured grants should be activated and/or determining that one or more of the plurality of configured grants should be deactivated. In step S704, the process comprises transmitting, to the infrastructure equipment, one or both of an activation signal if the communications device determines that one or more configured grants should be activated and a deactivation signal if the communications device determines that one or more configured grants should be deactivated. The activation signal indicates that the set of communications resources of each of the one or more configured grants that should be activated should be reserved for use by the communications device, and the deactivation signal indicates that the set of communications resources of each of the one or more configured grants that should be deactivated should be released for use by other communications devices. The process ends in step S704.

Those skilled in the art would appreciate that the method shown by FIG. 7 may be adapted in accordance with embodiments of the present technique. For example, other intermediate steps may be included in the method, or the steps may be performed in any logical order.

Though embodiments of the present technique have been described largely by way of the example system shown in FIG. 4, it would be clear to those skilled in the art that they could be equally applied to other systems such as those in which the infrastructure equipment/gNB initiates the activation/deactivation procedure rather than the communications device/UE. Those skilled in the art would also appreciate that embodiments of the present technique, though described primarily with respect to type 1 configured grant, are equally applicable to type 2 configured grant, as well as any other conceivable type of configured grant.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method for transmitting data by a communications device to an infrastructure equipment in a cell of a wireless communications network, the method comprising receiving an indication of a plurality of configured grants from the infrastructure equipment, each of the configured grants allocating a set of communications resources for the transmission of the data by the communications device within one of a plurality of bandwidth parts defining a frequency range within a system bandwidth of the cell, determining that one or more of the plurality of configured grants should be activated and/or determining that one or more of the plurality of configured grants should be deactivated, and transmitting, to the infrastructure equipment, one or both of an activation signal if the communications device determines that one or more configured grants should be activated and a deactivation signal if the communications device determines that one or more configured grants should be deactivated, wherein the activation signal indicates that the set of communications resources of each of the one or more configured grants that should be activated should be reserved for use by the communications device, and the deactivation signal indicates that the set of communications resources of each of the one or more configured grants that should be deactivated should be released for use by other communications devices.

Paragraph 2. A method according to Paragraph 1, wherein the one or both of the activation signal and the deactivation signal is carried in Medium Access Control, MAC, Control Elements, CEs transmitted by the communications device to the infrastructure equipment.

Paragraph 3. A method according to Paragraph 1 or Paragraph 2, comprising determining that one of the plurality of configured grants is a leading configured grant and that the others of the plurality of configured grants to the leading configured grants are associate configured grants, the leading configured grant having a shortest periodicity among the plurality of configured grants.

Paragraph 4. A method according to Paragraph 3, wherein if two or more of the plurality of configured grants have the same periodicity, determining that the one of the two or more of the plurality of configured grants having a lowest unique identifier among the two or more of the plurality of configured grants is the leading configured grant.

Paragraph 5. A method according to Paragraph 3 or Paragraph 4, wherein if two or more of the plurality of configured grants have the same periodicity, receiving an indication from the infrastructure equipment of which of the two or more of the plurality of configured grants is the leading configured grant.

Paragraph 6. A method according to any of Paragraphs 3 to 5, wherein the one or both of the activation signal and the deactivation is transmitted within the set of communications resources of the leading configured grant.

Paragraph 7. A method according to any of Paragraphs 3 to 6, wherein the communications device is able to transmit the one or both of the activation signal and the deactivation within the set of communications resources of any of the plurality of configured grants.

Paragraph 8. A method according to any of Paragraphs 3 to 7, comprising
receiving, from the infrastructure equipment, an indication of an association between each of one or more logical channels and a group of two or more of the configured grants, wherein the leading configured grant forms a part of the group of configured grants associated with each of the logical channels.

Paragraph 9. A method according to any of Paragraphs 1 to 8, comprising
receiving, from the infrastructure equipment, an indication that one of the plurality of configured grants is a leading configured grant and that the others of the plurality of configured grants to the leading configured grants are associate configured grants.

Paragraph 10. A method according to any of Paragraphs 1 to 9, wherein the activation signal comprises a unique identifier of each of the one or more configured grants that should be activated, and the deactivation signal comprises a unique identifier of each of the one or more configured grants that should be deactivated.

Paragraph 11. A method according to any of Paragraphs 1 to 10, wherein the activation signal and deactivation signal each comprise a bitmap formed of a plurality of bits each associated with one of the plurality of configured grants, a value of each of the plurality of bits indicating whether the associated configured grant should be activated or deactivated.

Paragraph 12. A method according to any of Paragraphs 1 to 11, comprising
starting a timer upon transmission of the one or both of the activation signal and the deactivation signal,
determining, on expiry of the timer, if a negative acknowledgement has been received from the infrastructure equipment, the negative acknowledgement indicating that the one or both of the activation signal and the deactivation signal has not been successfully received by the infrastructure equipment, and
if the negative acknowledgement has been received, retransmitting the one or both of the activation signal and the deactivation signal, or
if the negative acknowledgement has not been received, transmitting the data within the set of communications resources of each of the one or more configured grants indicated in the activation signal and/or ceasing transmission of the data within the set of communications resources of each of the one or more configured grants indicated in the deactivation signal.

Paragraph 13. A method according to any of Paragraphs 1 to 12, comprising
starting a timer upon transmission of the one or both of the activation signal and the deactivation signal,
determining, on expiry of the timer, if an acknowledgement has been received from the infrastructure equipment, the acknowledgement indicating that the one or both of the activation signal and the deactivation signal has been successfully received by the infrastructure equipment, and
if the acknowledgement has not been received, retransmitting the one or both of the activation signal and the deactivation signal, or
if the acknowledgement has been received, transmitting the data within the set of communications resources of each of the one or more configured grants indicated in the activation signal and/or ceasing transmission of the data within the set of communications resources of each of the one or more configured grants indicated in the deactivation signal.

Paragraph 14. A method according to any of Paragraphs 1 to 13, wherein each of the configured grants is associated with an inactivity timer that is restarted upon each transmission of data by the communications device within the set of communications resources of the configured grant associated with the inactivity timer, and the determining that one or more of the plurality of configured grants should be deactivated comprises determining that the inactivity timer associated with each of the one or more configured grants that should be deactivated has expired.

Paragraph 15. A method according to any of Paragraphs 1 to 14, wherein the activation signal is one of a scheduling request and a buffer status report indicating that the communications device requires more communications resources within which to transmit data, wherein the one of the scheduling request and the buffer status report is associated with one or more logical channels which are associated with the one or more configured grants that should be activated.

Paragraph 16. A method according to any of Paragraphs 1 to 15, wherein the determining that one or more of the plurality of configured grants should be activated is dependent on one or more specified communications conditions.

Paragraph 17. A method according to Paragraph 16, wherein the one or more specified communications conditions comprise:
a relative quality of signals transmitted or received within the set of communications resources of each of the one or more configured grants that should be activated is above a threshold value;
a reference signal received power of a reference signal received within the set of communications resources of each of the one or more configured grants that should be activated is above a threshold value;
a jitter tolerance level of signals transmitted or received within the set of communications resources of each of the one or more configured grants that should be activated is above a threshold value; and
an average amount of data for transmission by the communications device per activated configured grant is above a threshold value.

Paragraph 18. A method according to Paragraph 16 or Paragraph 17, wherein the one or more specified conditions and the threshold values for each of the one or more specified conditions are indicated to the communications device by the infrastructure equipment.

Paragraph 19. A method according to any of Paragraphs 1 to 18, wherein the determining that one or more of the plurality of configured grants should be deactivated is dependent on one or more specified communications conditions.

Paragraph 20. A method according to Paragraph 19, wherein the one or more specified communications conditions comprise:
a relative quality of signals transmitted or received within the set of communications resources of each of the one or more configured grants that should be deactivated is below a threshold value;
a reference signal received power of a reference signal received within the set of communications resources of each of the one or more configured grants that should be deactivated is below a threshold value;
a jitter tolerance level of signals transmitted or received within the set of communications resources of each of the one or more configured grants that should be deactivated is below a threshold value; and a duration over which no data has been transmitted by the communications device within the set of communications resources of each of the one or more configured grants that should be deactivated is above a threshold value.

Paragraph 21. A method according to Paragraph 19 or Paragraph 20, wherein the one or more specified conditions and the threshold values for each of the one or more specified conditions are indicated to the communications device by the infrastructure equipment.

Paragraph 22. A method according to any of Paragraphs 1 to 21, comprising receiving a confirmation signal from the infrastructure equipment in response to transmitting the activation signal and/or the deactivation signal, and, in response to receiving the confirmation signal, transmitting the data within the set of communications resources of each of the one or more configured grants indicated in the activation signal and/or ceasing transmission of the data within the set of communications resources of each of the one or more configured grants indicated in the deactivation signal.

Paragraph 23. A communications device configured to transmit data to an infrastructure equipment in a cell of a wireless communications network, the communications device comprising transceiver circuitry configured to transmit signals and receive signals via a wireless access interface provided by the wireless communications network, and controller circuitry configured to control the transceiver circuitry to receive an indication of a plurality of configured grants from the infrastructure equipment, each of the configured grants allocating a set of communications resources for the transmission of the data by the communications device within one of a plurality of bandwidth parts defining a frequency range within a system bandwidth of the cell, to determine that one or more of the plurality of configured grants should be activated and/or to determine that one or more of the plurality of configured grants should be deactivated, and to transmit, to the infrastructure equipment, one or both of an activation signal if the communications device determines that one or more configured grants should be activated and a deactivation signal if the communications device determines that one or more configured grants should be deactivated, wherein the activation signal indicates that the set of communications resources of each of the one or more configured grants that should be activated should be reserved for use by the communications device, and the deactivation signal indicates that the set of communications resources of each of the one or more configured grants that should be deactivated should be released for use by other communications devices.

Paragraph 24. Circuitry for a communications device configured to transmit data to an infrastructure equipment in a cell of a wireless communications network, the communications device comprising transceiver circuitry configured to transmit signals and receive signals via a wireless access interface provided by the wireless communications network, and controller circuitry configured to control the transceiver circuitry to receive an indication of a plurality of configured grants from the infrastructure equipment, each of the configured grants allocating a set of communications resources for the transmission of the data by the communications device within one of a plurality of bandwidth parts defining a frequency range within a system bandwidth of the cell, to determine that one or more of the plurality of configured grants should be activated and/or to determine that one or more of the plurality of configured grants should be deactivated, and to transmit, to the infrastructure equipment, one or both of an activation signal if the communications device determines that one or more configured grants should be activated and a deactivation signal if the communications device determines that one or more configured grants should be deactivated, wherein the activation signal indicates that the set of communications resources of each of the one or more configured grants that should be activated should be reserved for use by the communications device, and the deactivation signal indicates that the set of communications resources of each of the one or more configured grants that should be deactivated should be released for use by other communications devices.

Paragraph 25. A method of operating an infrastructure equipment of a wireless communications network, the infrastructure equipment providing a cell, the method comprising transmitting an indication of a plurality of configured grants to the communications device, each of the configured grants allocating a set of communications resources for the transmission of data by the communications device to the infrastructure equipment within one of a plurality of bandwidth parts defining a frequency range within a system bandwidth of the cell, determining that one or more of the plurality of configured grants should be activated and/or determining that one or more of the plurality of configured grants should be deactivated, and transmitting, to the communications device, one or both of an activation signal if the infrastructure equipment determines that one or more configured grants should be activated and a deactivation signal if the infrastructure equipment determines that one or more configured grants should be deactivated, wherein the activation signal indicates that the set of communications resources of each of the one or more configured grants that should be activated should be reserved for use by the communications device, and the deactivation signal indicates that the set of communications resources of each of the one or more configured grants that should be deactivated should be released for use by other communications devices.

Paragraph 26. A method according to Paragraph 25, wherein the one or both of the activation signal and the deactivation signal is carried in Medium Access Control, MAC, Control Elements, CEs transmitted by the infrastructure equipment to the communications device.

Paragraph 27. A method according to Paragraph 25 or Paragraph 26, wherein the one or both of the activation signal and the deactivation signal is carried in downlink control information transmitted by the infrastructure equipment to the communications device.

Paragraph 28. A method according to any of Paragraphs 25 to 27, comprising determining that one of the plurality of configured grants is a leading configured grant and that the others of the plurality of configured grants to the leading configured grants are associate configured grants, the leading configured grant having a shortest periodicity among the plurality of configured grants.

Paragraph 29. A method according to Paragraph 28, wherein if two or more of the plurality of configured grants have the same periodicity, determining that the one of the two or more of the plurality of configured grants having a lowest unique identifier among the two or more of the plurality of configured grants is the leading configured grant.

Paragraph 30. A method according to Paragraph 28 or Paragraph 29, wherein if two or more of the plurality of configured grants have the same periodicity, transmitting an indication to the communications device of which of the two or more of the plurality of configured grants is the leading configured grant.

Paragraph 31. A method according to any of Paragraphs 28 to 30, comprising
    transmitting, to the communications device, an indication of an association between each of one or more logical channels and a group of two or more of the configured grants, wherein the leading configured grant forms a part of the group of configured grants associated with each of the logical channels.

Paragraph 32. A method according to any of Paragraphs 25 to 31, comprising
    transmitting, to the communications device, an indication that one of the plurality of configured grants is a leading configured grant and that the others of the plurality of configured grants to the leading configured grants are associate configured grants Paragraph 33. A method according to any of Paragraphs 25 to 32, wherein the activation signal comprises a unique identifier of each of the one or more configured grants that should be activated, and the deactivation signal comprises a unique identifier of each of the one or more configured grants that should be deactivated.

Paragraph 34. A method according to any of Paragraphs 25 to 33, wherein the activation signal and deactivation signal each comprise a bitmap formed of a plurality of bits each associated with one of the plurality of configured grants, a value of each of the plurality of bits indicating whether the associated configured grant should be activated or deactivated.

Paragraph 35. A method according to any of Paragraphs 25 to 34, wherein each of the configured grants is associated with an inactivity timer that is restarted upon each transmission of data by the communications device within the set of communications resources of the configured grant associated with the inactivity timer, and the determining that one or more of the plurality of configured grants should be deactivated comprises determining that the inactivity timer associated with each of the one or more configured grants that should be deactivated has expired.

Paragraph 36. A method according to any of Paragraphs 25 to 35, comprising
    transmitting an allocation message to at least one other communications device after transmitting the deactivation signal, the allocation message indicating that the at least one other communications device may transmit data within the set of communications resources of each of the one or more configured grants indicated in the deactivation signal.

Paragraph 37. A method according to any of Paragraphs 25 to 36, wherein the determining that one or more of the plurality of configured grants should be activated is dependent on one or more specified communications conditions.

Paragraph 38. A method according to Paragraph 37, wherein the one or more specified communications conditions comprise:
    a relative quality of signals transmitted or received within the set of communications resources of each of the one or more configured grants that should be activated is above a threshold value;
    a reference signal received power of a reference signal received within the set of communications resources of each of the one or more configured grants that should be activated is above a threshold value;
    a jitter tolerance level of signals transmitted or received within the set of communications resources of each of the one or more configured grants that should be activated is above a threshold value; and
    an average amount of data for transmission by the communications device per activated configured grant is above a threshold value.

Paragraph 39. A method according to Paragraph 37 or Paragraph 38, comprising
    indicating the one or more specified conditions and the threshold values for each of the one or more specified conditions are indicated to the communications device.

Paragraph 40. A method according to any of Paragraphs 25 to 39, wherein the determining that one or more of the plurality of configured grants should be deactivated is dependent on one or more specified communications conditions.

Paragraph 41. A method according to Paragraph 40, wherein the one or more specified communications conditions comprise:
    a relative quality of signals transmitted or received within the set of communications resources of each of the one or more configured grants that should be deactivated is below a threshold value;
    a reference signal received power of a reference signal received within the set of communications resources of each of the one or more configured grants that should be deactivated is below a threshold value;
    a jitter tolerance level of signals transmitted or received within the set of communications resources of each of the one or more configured grants that should be deactivated is below a threshold value; and
    a duration over which no data has been transmitted by the communications device within the set of communications resources of each of the one or more configured grants that should be deactivated is above a threshold value.

Paragraph 42. A method according to Paragraph 40 or Paragraph 41, comprising
    indicating the one or more specified conditions and the threshold values for each of the one or more specified conditions are indicated to the communications device.

Paragraph 43. An infrastructure equipment of a wireless communications network, the infrastructure equipment providing a cell, the infrastructure equipment comprising
    transceiver circuitry configured to transmit signals and receive signals via a wireless access interface provided by the wireless communications network, and
    controller circuitry configured to control the transceiver circuitry
    to transmit an indication of a plurality of configured grants to the communications device, each of the configured grants allocating a set of communications resources for the transmission of data by the communications device to the infrastructure equipment within one of a plurality of bandwidth parts defining a frequency range within a system bandwidth of the cell, to determine that one or more of the plurality of configured grants should be activated and/or to determine that one or more of the plurality of configured grants should be deactivated, and to transmit, to the communications device, one or both of an activation signal if the infrastructure equipment determines that one or more configured grants should be activated and a deactivation signal if the infrastructure equipment determines that one or more configured grants should be deactivated, wherein the activation signal indicates that the set of communications resources of each of the one or more configured grants that should be activated should be reserved for use by the communications device, and the deactivation signal indicates that the set of communications resources of each of the one or more configured grants that should be deactivated should be released for use by other communications devices.

Paragraph 44. Circuitry for an infrastructure equipment of a wireless communications network, the infrastructure equipment providing a cell, the infrastructure equipment comprising transceiver circuitry configured to transmit signals and receive signals via a wireless access interface provided by the wireless communications network, and controller circuitry configured to control the transceiver circuitry to transmit an indication of a plurality of configured grants to the communications device, each of the configured grants allocating a set of communications resources for the transmission of data by the communications device to the infrastructure equipment within one of a plurality of bandwidth parts defining a frequency range within a system bandwidth of the cell, to determine that one or more of the plurality of configured grants should be activated and/or to determine that one or more of the plurality of configured grants should be deactivated, and to transmit, to the communications device, one or both of an activation signal if the infrastructure equipment determines that one or more configured grants should be activated and a deactivation signal if the infrastructure equipment determines that one or more configured grants should be deactivated, wherein the activation signal indicates that the set of communications resources of each of the one or more configured grants that should be activated should be reserved for use by the communications device, and the deactivation signal indicates that the set of communications resources of each of the one or more configured grants that should be deactivated should be released for use by other communications devices.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software miming on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-182090, "Revised SID: Study on NR Industrial Internet of Things (IoT)," 3GPP RAN #81.
[2] Holma H. and Toskala A, "LTE for UMTS OFDMA and SC-FDMA based radio access", John Wiley and Sons, 2009.
[3] 3GPP TS 38.321, "Medium Access Control (MAC) protocol specification (Rel-15)", v15.3.0.
[4] TR 38.825, "Study on NR Industrial Internet of Things (IoT)", 3GPP Rel-16.
[5] R2-1818991, "LS on multiple active configured grant configurations", RAN2 #104.

What is claimed is:

1. A method for transmitting data by a communications device to an infrastructure equipment in a cell of a wireless communications network, the method comprising:

receiving an indication of a plurality of configured grants from the infrastructure equipment, each of the configured grants allocating a set of communications resources for the transmission of the data by the communications device within one of a plurality of bandwidth parts defining a frequency range within a system bandwidth of the cell, determining that one or more of the plurality of configured grants should be activated and/or determining that one or more of the plurality of configured grants should be deactivated, and transmitting, to the infrastructure equipment, one or both of an activation signal if the communications device determines that the one or more configured grants should be activated and a deactivation signal if the communications device determines that the one or more configured grants should be deactivated, wherein the activation signal, transmitted to the infrastructure equipment, indicates that the set of communications resources of each of the one or more configured grants that should be activated should be reserved for use by the communications device, and the deactivation signal, transmitted to the infrastructure equipment, indicates that the set of communications resources of each of the one or more configured grants that should be deactivated should be released for use by other communications devices, and wherein the one or both of the activation signal and the deactivation signal, transmitted by the communications device to the infrastructure equipment, is carried in Medium Access Control (MAC) Control Elements (CEs).

2. The method according to claim 1, further comprising: determining that one of the plurality of configured grants is a leading configured grant and that the others of the plurality of configured grants are associate configured grants, the leading configured grant having a shortest periodicity among the plurality of configured grants.

3. The method according to claim 2, wherein if two or more of the plurality of configured grants have the same periodicity, the method includes determining that the one of the two or more of the plurality of configured grants having a lowest unique identifier among the two or more of the plurality of configured grants is the leading configured grant.

4. The method according to claim 2, wherein if two or more of the plurality of configured grants have the same periodicity, the method includes receiving an indication from the infrastructure equipment of which of the two or more of the plurality of configured grants is the leading configured grant.

5. The method according to claim 2, wherein the one or both of the activation signal that indicates that the set of communications resources of each of the one or more configured grants including the at least one of the associate configure grants that should be activated should be reserved for use by the communications device and the deactivation signal that indicates that the set of communications resources of each of the one or more configured grants including the at least one of the associate configure grants that should be deactivated should be released for use by other communications devices is transmitted within the set of communications resources of the leading configured grant.

6. The method according to claim 2, wherein the communications device is configured to transmit the one or both of the activation signal and the deactivation within the set of communications resources of any of the plurality of configured grants.

7. The method according to claim 2, further comprising: receiving, from the infrastructure equipment, an indication of an association between each of one or more logical channels and a group of two or more of the configured grants,
wherein the leading configured grant forms a part of the group of configured grants associated with each of the logical channels.

8. The method according to claim 1, further comprising: receiving, from the infrastructure equipment, an indication that one of the plurality of configured grants is a leading configured grant and that the others of the plurality of configured grants are associate configured grants.

9. The method according to claim 1, wherein
the activation signal comprises a unique identifier of each of the one or more configured grants that should be activated, and
the deactivation signal comprises a unique identifier of each of the one or more configured grants that should be deactivated.

10. The method according to claim 1, wherein
the activation signal and deactivation signal each comprise a bitmap formed of a plurality of bits each associated with one of the plurality of configured grants, and
a value of each of the plurality of bits indicate whether the associated configured grant should be activated or deactivated.

11. The method according to claim 1, further comprising:
starting a timer upon transmission of the one or both of the activation signal and the deactivation signal,
determining, on expiry of the timer, if a negative acknowledgement has been received from the infrastructure equipment, the negative acknowledgement indicating that the one or both of the activation signal and the deactivation signal has not been successfully received by the infrastructure equipment, and
if the negative acknowledgement has been received, retransmitting the one or both of the activation signal and the deactivation signal, or
if the negative acknowledgement has not been received, transmitting the data within the set of communications resources of each of the one or more configured grants indicated in the activation signal and/or ceasing transmission of the data within the set of communications resources of each of the one or more configured grants indicated in the deactivation signal.

12. The method according to claim 1, further comprising:
starting a timer upon transmission of the one or both of the activation signal and the deactivation signal,
determining, on expiry of the timer, if an acknowledgement has been received from the infrastructure equipment, the acknowledgement indicating that the one or both of the activation signal and the deactivation signal has been successfully received by the infrastructure equipment, and
if the acknowledgement has not been received, retransmitting the one or both of the activation signal and the deactivation signal, or
if the acknowledgement has been received, transmitting the data within the set of communications resources of each of the one or more configured grants indicated in the activation signal and/or ceasing transmission of the data within the set of communications resources of each of the one or more configured grants indicated in the deactivation signal.

13. The method according to claim 1, wherein
each of the configured grants is associated with an inactivity timer that is restarted upon each transmission of data by the communications device within the set of communications resources of the configured grant associated with the inactivity timer, and
the determining that one or more of the plurality of configured grants should be deactivated comprises determining that the inactivity timer associated with each of the one or more configured grants that should be deactivated has expired.

14. The method according to claim 1, wherein
the activation signal is one of a scheduling request and a buffer status report indicating that the communications device requires more communications resources within which to transmit data, and
the one of the scheduling request and the buffer status report is associated with one or more logical channels which are associated with the one or more configured grants that should be activated.

15. The method according to claim 1, wherein the determining that one or more of the plurality of configured grants should be activated is dependent on one or more specified communications conditions.

16. The method according to claim 1, wherein the determining that one or more of the plurality of configured grants should be deactivated is dependent on one or more specified communications conditions.

17. The method according to claim 1, further comprising:
receiving a confirmation signal from the infrastructure equipment in response to transmitting the activation signal and/or the deactivation signal, and
in response to receiving the confirmation signal:
transmitting the data within the set of communications resources of each of the one or more configured grants indicated in the activation signal and/or ceasing transmission of the data within the set of communications resources of each of the one or more configured grants indicated in the deactivation signal.

18. A communications device configured to transmit data to an infrastructure equipment in a cell of a wireless communications network, the communications device comprising:
transceiver circuitry configured to transmit signals and receive signals via a wireless access interface provided by the wireless communications network, and
controller circuitry configured to control the transceiver circuitry:
to receive an indication of a plurality of configured grants from the infrastructure equipment, each of the configured grants allocating a set of communications resources for the transmission of the data by the communications device within one of a plurality of bandwidth parts defining a frequency range within a system bandwidth of the cell,
to determine that one or more of the plurality of configured grants should be activated and/or to determine that one or more of the plurality of configured grants should be deactivated, and
to transmit, to the infrastructure equipment, one or both of an activation signal if the communications device determines that the one or more configured grants should be activated and a deactivation signal if the communications device determines that the one or more configured grants should be deactivated,
wherein the activation signal, transmitted to the infrastructure equipment, indicates that the set of communications resources of each of the one or more configured grants that should be activated should be reserved for use by the communications device, and the deactivation signal, transmitted to the infrastructure equipment, indicates that the set of communications resources of each of the one or more configured grants that should be deactivated should be released for use by other communications devices, and
wherein the one or both of the activation signal and the deactivation signal, transmitted by the communications device to the infrastructure equipment, is carried in Medium Access Control (MAC) Control Elements (CEs).

19. An infrastructure equipment of a wireless communications network, the infrastructure equipment providing a cell, the infrastructure equipment comprising:
transceiver circuitry configured to transmit signals and receive signals via a wireless access interface provided by the wireless communications network, and
controller circuitry configured to control the transceiver circuitry:
to transmit an indication of a plurality of configured grants to a communications device, each of the configured grants allocating a set of communications resources for the transmission of data by the communications device to the infrastructure equipment within one of a plurality of bandwidth parts defining a frequency range within a system bandwidth of the cell,
to determine that one of the plurality of configured grants is a leading configured grant and that the others of the plurality of configured grants are associate configured grants,
to determine that one or more of the plurality of configured grants including at least one of the associate configure grants should be activated and/or to determine that one or more of the plurality of configured grants including at least one of the associate configure grants should be deactivated, and
to transmit, to the communications device and using the set of communications resources allocated to the leading configured grant, one or both of an activation signal if the infrastructure equipment determines that the one or more configured grants including the at least one of the associate configure grants should be activated and a deactivation signal if the infrastructure equipment determines that the one or more configured grants including the at least one of the associate configure grants should be deactivated,
wherein the activation signal indicates that the set of communications resources of each of the one or more configured grants including the at least one of the associate configure grants that should be activated should be reserved for use by the communications device, and the deactivation signal indicates that the set of communications resources of each of the one or more configured grants including the at least one of the associate configure grants that should be deactivated should be released for use by other communications devices, and
wherein the one or both of the activation signal and the deactivation signal, transmitted by the infrastructure equipment to the communications device, is carried in Medium Access Control (MAC) Control Elements (CEs).

* * * * *